United States Patent
Amento et al.

(10) Patent No.: US 10,440,433 B2
(45) Date of Patent: *Oct. 8, 2019

(54) AUTOMATIC RATING SYSTEM USING BACKGROUND AUDIO CUES

(71) Applicant: AT&T INTELLECTUAL PROPERTY II, L.P., Atlanta, GA (US)

(72) Inventors: Brian Amento, Morris Plains, NJ (US); Christopher Harrison, Mount Kisco, NY (US); Larry Stead, Upper Montclair, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,444

(22) Filed: Feb. 16, 2017

(65) Prior Publication Data
US 2017/0164054 A1    Jun. 8, 2017

Related U.S. Application Data

(63) Continuation of application No. 14/170,895, filed on Feb. 3, 2014, now Pat. No. 9,606,768, which is a continuation of application No. 12/006,311, filed on Jan. 2, 2008, now Pat. No. 8,677,386.

(51) Int. Cl.
| | |
|---|---|
| H04N 21/45 | (2011.01) |
| H04N 21/422 | (2011.01) |
| G06F 16/48 | (2019.01) |
| G06F 3/16 | (2006.01) |
| H04N 21/4223 | (2011.01) |
| H04N 21/258 | (2011.01) |
| H04N 21/24 | (2011.01) |
| H04N 21/25 | (2011.01) |

(52) U.S. Cl.
CPC ......... *H04N 21/4532* (2013.01); *G06F 3/167* (2013.01); *G06F 16/48* (2019.01); *H04N 21/422* (2013.01); *H04N 21/4223* (2013.01); *H04N 21/42201* (2013.01); *H04N 21/42203* (2013.01); *H04N 21/45* (2013.01); *G06F 3/16* (2013.01); *H04N 21/24* (2013.01); *H04N 21/2407* (2013.01); *H04N 21/25* (2013.01); *H04N 21/251* (2013.01); *H04N 21/258* (2013.01); *H04N 21/25891* (2013.01)

(58) Field of Classification Search
None
See application file for complete search history.

(56) References Cited

U.S. PATENT DOCUMENTS

| | | | |
|---|---|---|---|
| 7,237,250 B2 | 6/2007 | Kanojia | |
| 2003/0093784 A1* | 5/2003 | Dimitrova | H04N 7/163 725/10 |
| 2005/0055708 A1 | 3/2005 | Gould | |
| 2005/0071865 A1 | 3/2005 | Martins | |
| 2005/0256712 A1* | 11/2005 | Yamada | G10L 15/065 704/255 |

(Continued)

*Primary Examiner* — Justin E Shepard
(74) *Attorney, Agent, or Firm* — Guntin & Gust, PLC; Mark Wilinski

(57) ABSTRACT

Methods and systems for capturing, transmitting and processing data for generating ratings relating to multimedia programming based on passively obtained user cues are disclosed herein.

20 Claims, 3 Drawing Sheets

(56) References Cited

U.S. PATENT DOCUMENTS

| | | | |
|---|---|---|---|
| 2005/0281410 A1* | 12/2005 | Grosvenor | H04H 60/04 |
| | | | 381/61 |
| 2006/0048189 A1 | 3/2006 | Park | |
| 2006/0136965 A1 | 6/2006 | Ellis | |
| 2006/0206379 A1* | 9/2006 | Rosenberg | G06Q 30/02 |
| | | | 705/14.54 |
| 2007/0186228 A1 | 8/2007 | Ramaswamy | |
| 2009/0043586 A1* | 2/2009 | MacAuslan | G10L 17/26 |
| | | | 704/270 |

* cited by examiner

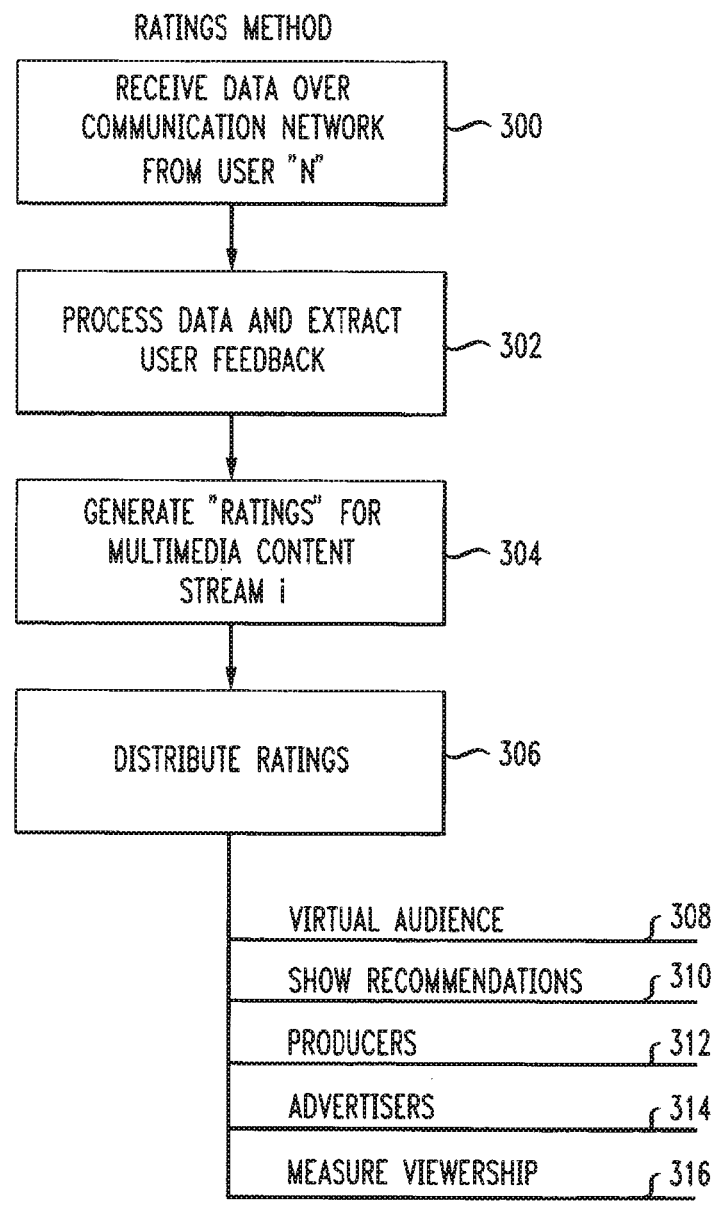

AUTOMATIC RATING SYSTEM USING BACKGROUND AUDIO CUES

CROSS-REFERENCE TO RELATED APPLICATIONS

This application is a continuation of and claims priority to U.S. patent application Ser. No. 14/170,895 filed Feb. 3, 2014, which is a continuation of and claims priority to U.S. patent application Ser. No. 12/006,311 filed Jan. 2, 2008, issued as U.S. Pat. No. 8,677,386. The disclosures of each of the foregoing are incorporated herein by reference in their entirety.

FIELD OF THE DISCLOSURE

The present invention relates generally to providing multimedia content over a communications network, and more particularly, to an automated system for rating such multimedia content based on cues that are passively gathered from the user.

BACKGROUND OF THE DISCLOSURE

The delivery of multimedia and other content over communications networks is well known in the art. Examples include, but are not limited to, web browsing, File Transfer Protocol (FTP), Internet Protocol (IP) services such as Voice-over-IP (VoIP), and even conventional Cable Television (CATV) over Hybrid Fiber Coax (HFC).

In the context of television programming, delivered either via HFC, IP or the like, current technology enables users to provide ratings for such programming (or other dynamic media such as radio, CD, audio books, etc.). However, the current state of the art requires that the users actively provide such feedback. This is often accomplished by the user manipulating a remote control or keyboard. For example, the well-known TiVo® remote has data input controls for accepting such user input. However, the need for active user participation decreases the likelihood for the typical TV audience to provide any feedback.

It would therefore be desirable to provide a system and methodology whereby a viewer of multimedia content can provide feedback to a service provider or other entity in a transparent, non-invasive way that obviates the need for explicit viewer participation.

SUMMARY

In accordance with aspects of the invention(s), methods and systems for capturing, transmitting and processing data for generating ratings relating to multimedia programming based on passively obtained user cues are disclosed herein.

An exemplary method, in the broadest sense, generally comprises the step of: receiving data over the communications network, the data comprising cues providing feedback regarding the multimedia content from at least one of the end users in a manner transparent to the user.

In accordance with another aspect of the invention, a system for gathering user feedback, that can be used for example, to rate multimedia content that is distributed to end users over a communications network, comprises: a network element adapted for receiving data over the communications network, the data comprising cues providing feedback regarding the multimedia content from at least one of the end users in a manner transparent to the user.

In accordance with still another aspect of the invention, a memory medium containing programmable machine readable instructions which, when executed by a processor, enable a network element to obtain rating data regarding multimedia content that is communicated to end users over a communications network, enable a system, device, network or other entity or apparatus to receive data over the communications network, where the data comprises cues providing feedback regarding the multimedia content from at least one of the end users in a manner transparent to the user.

These and further advantages will become apparent to those skilled in the art as the present invention is described with particular reference to the accompanying drawings.

BRIEF DESCRIPTION OF THE DRAWINGS

FIG. 3 is a flow chart describing a Ratings Method.

DETAILED DESCRIPTION OF THE DRAWINGS

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
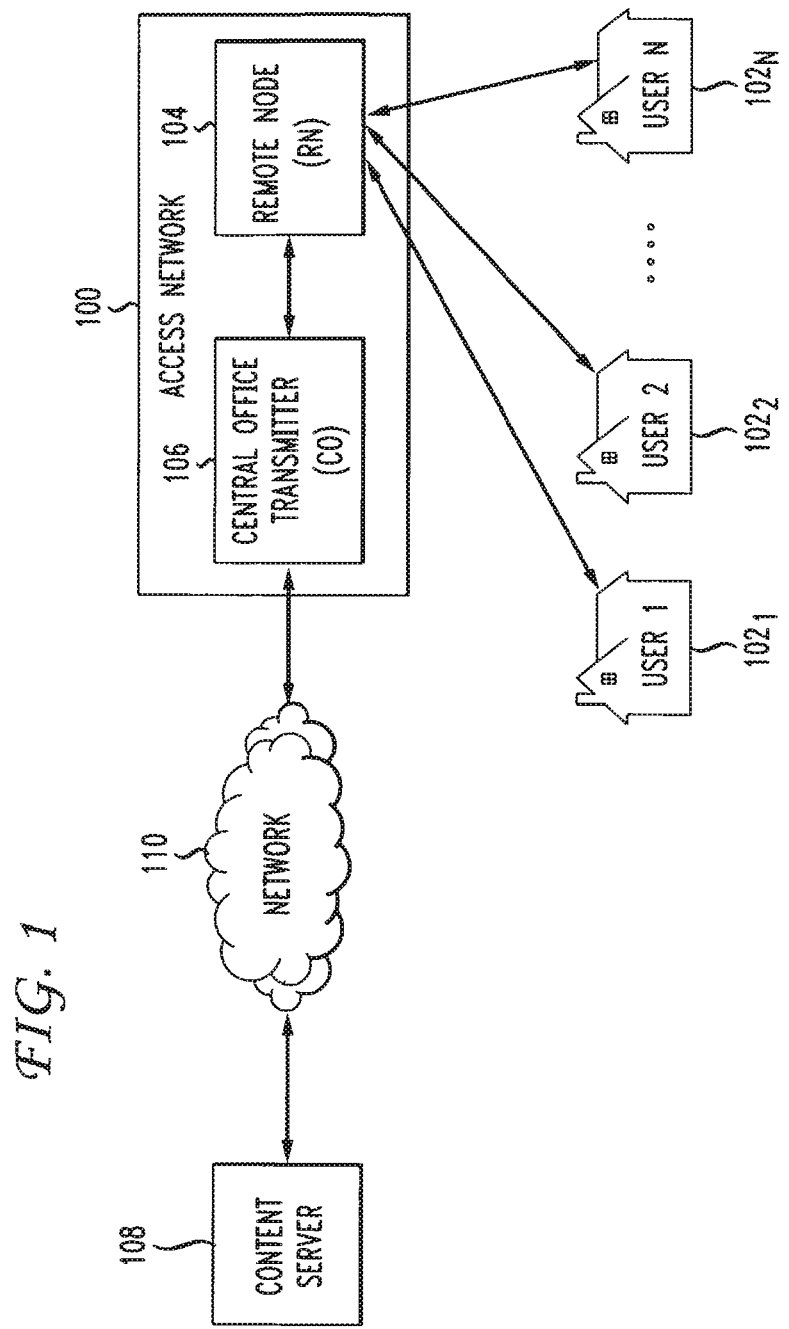
FIG. 1 is a schematic of an illustrative network architecture embodying a Hybrid Fiber Coax (HFC) network serving a plurality of users.

In accordance with a first aspect of the invention, a method and system for rating multimedia content is disclosed. With reference to FIG. 1, an illustrative network architecture in the form a Hybrid Fiber Coax (HFC) delivery system is shown, which generally comprises an access network 100 that delivers communications services to a plurality of end users $102_1, 102_2, \ldots, 102_N$. The access network may comprise, in an exemplary expedient (shown here as an optical network) a Remote Node (RN) 104 coupled to a Central Office (CO) 106 or other entity. The RN 104 may be adapted to communicate with the end users $102_1, 102_2, \ldots, 102_N$ via optical, electrical, electro-optical, or any other hereinafter developed network technology. The CO 106 and RN 104 communicate with each other in a conventional fashion and such communications and system architectures are not relevant to the present invention. In the context of multimedia content delivery, a content server 108 that generates or stores multimedia content is coupled to the access network via another network shown generally at 110.

Figure 2:
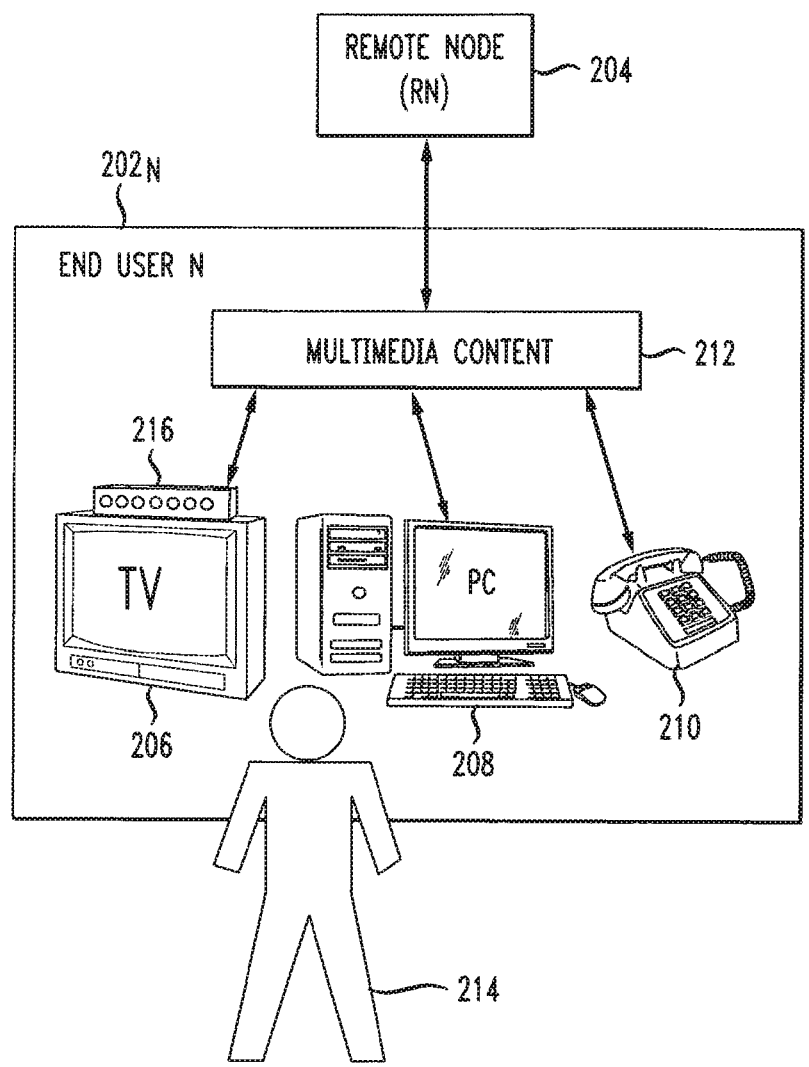
FIG. 2 is a schematic of a user site that provides for multimedia content distribution to a user and a remote node communicating with the user site.

FIG. 2 is a schematic of a RN 204 coupled to an exemplary end user site $202_N$ (e.g., a residence or business). End user site $202_N$ may include a plurality of network access devices, such as, for example, a TV 206, personal computer 208, telephone 210 and/or the like. Multimedia content 212 is presented to an end user 214 in a conventional manner via the network access device. In accordance with the present invention, a passive feedback device 216, which is either part of the network access device or a standalone apparatus, enables data comprising "user cues" to be transparently "received" from the viewer of the multimedia content. The "data" may be in the form of audio, visual or audio-visual "cues." In this regard, the passive feedback device 216 may be a microphone, video camera or some like apparatus that is adapted to be coupled to the network.

With reference to FIG. 3, a method in accordance with an aspect of the invention for rating multimedia content is disclosed. The method generally comprises the step 300 of receiving data over a communications network from an end user, where such data comprises cues that provide real-time (or almost real-time) user feedback concerning the multimedia content. In step 302, a "system" (architecture is not relevant at this point) processes the data and extracts the user "feedback", which may be in the form of a viewer laughing or otherwise reacting to something seen in the programming.

The cues, as previously discussed, may be aural, visual or audio-visual in nature and can be measured in terms of intensity and/or duration. Such cues may further be processed with specific regard to the multimedia content stream i to enable a service provider or other entity to generate "ratings" for the programming in step 304. In this context, the cues may be temporally mapped against the content which could then be distributed in step 306 for multiple purposes, including but not limited to virtual audiences 308, providing show recommendations 310, enabling producers to understand which content is most likely to generate the best revenue 312, advertisers 314 and service providers (e.g., TV networks) 316.

For example, a particular "comedy" might cause a viewer to laugh, an interesting documentary might elicit a thought provoking discussion, or a horror "flick" might cause shock or fear. These aural, visual or audio-visual cues may be identified, captured and processed by the network access device in real or quasi real-time. A variety of acoustic models can be created to monitor different aural cues, such as a scream which, obviously, has different properties than laughter. In the case of conversation, the inventive method can identify dialog without the need for complicated speech recognition technology, or the need to even understand the content at all. Such mapping of user's audio or visual expressions for the purpose of authentication is known in the art.

In addition to monitoring the frequency and duration of such cues, in accordance with aspects of the invention, an interested entity or device can record when such viewer feedback is generated. For example, a set-top box (in the HFC context) knows what multimedia content (i.e., TV show) is being shown and the points in the show if and when, the viewer has which type of reactions thereto. This data, as described above, can be temporally correlated with the media content, thereby enabling the generation of a continuous ratings profile.

Another aspect of the invention comprises a memory medium storing machine readable instructions which, when executed by a processor enable a system, device or other entity/apparatus to generate the above-described ratings from passively obtained user cues. The memory medium may be part of the network access device described above, or disposed anywhere within the network or a separate entity responsible for generating ratings for multimedia programming The memory medium and instructions may be embodied in software, hardware or firmware, as is well understood by those of ordinary skill in the art.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that various modifications will be implemented by those skilled in the art, without departing from the scope and spirit of the invention.

What is claimed is:

1. A method, comprising:

accessing, by a processing system including a processor, data comprising feedback captured during presentation of a media content item at equipment of an end user to provide cues regarding a reaction of the end user to the media content item, the data being obtained without providing an alert to the end user that the feedback regarding the reaction is being monitored;

processing, by the processing system, the data by identifying the feedback and by determining frequencies and durations of the cues, wherein the frequencies of the cues include a count of the cues;

monitoring, by the processing system, the cues according to a plurality of acoustic models;

determining, by the processing system, types of cues based on the monitoring of the cues, wherein the types of cues include verbal cues and non-verbal cues;

generating, by the processing system, a ratings profile of the media content item based on a temporal correlation of the feedback, the types of cues, and the frequencies and durations of the cues;

based on the feedback obtained from the equipment, distributing, by the processing system, a temporal mapping of the cues against the media content item to a virtual audience, advertisers, service providers, or a combination thereof, wherein the service providers include a television network;

providing, by the processing system, a plurality of programming recommendations based on the temporal mapping; and providing, by the processing system, producers an indication of a plurality of media content that is most likely to generate revenue based on the temporal mapping, wherein the media content item is included in the plurality of media content.

2. The method of claim 1, wherein the feedback comprises audible cues of a reaction of the end user to the media content item.

3. The method of claim 2, wherein the feedback comprises audio cues that are sounds without speech.

4. The method of claim 3, wherein the feedback includes aurally distinguishable cues, including screams and laughter.

5. The method of claim 1, wherein the feedback comprises visual cues based on the reaction of the end user to the media content item.

6. The method of claim 1, wherein the feedback comprises audio-visual cues of the reaction of the end user to the media content item.

7. The method of claim 1, wherein the processing of the data further comprises monitoring, by the processing system, a frequency of the feedback.

8. The method of claim 1, further comprising identifying dialog without using speech recognition, wherein the feedback is captured during presentation of a media content item at equipment of an end user to provide one of real-time feedback or near-real-time feedback of the reaction of the end user to the media content item.

9. The method of claim 1, wherein the accessing of the data comprises measuring, by the processing system, intensities of the cues, and wherein the ratings profile of the media content item is based on the intensities of the cues.

10. A system, comprising:
a processing system including a processor; and
a memory that stores executable instructions that, when executed by the processing system, facilitate performance of operations, comprising:
acquiring data comprising feedback regarding a reaction of an end user to a media content item distributed to equipment of the end user over a communication network;
determining frequencies and durations of cues based on the feedback, wherein the frequencies of the cues include a count of the cues;
monitoring the cues according to a plurality of acoustic models;
determining types of the cues based on the monitoring of the cues, wherein the types of the cues include verbal cues and non-verbal cues;
generating, for the media content item, a continuous ratings profile based on the types of the cues, and the frequencies and durations of the cues;
based on the feedback obtained from the equipment, distributing a temporal mapping of the cues against the media content item to a virtual audience, advertisers, service providers, or a combination thereof, wherein the service providers include a television network;
providing a plurality of programming recommendations based on the temporal mapping; and
providing producers an indication of a plurality of media content that is most likely to generate revenue based on the temporal mapping, wherein the media content item is included in the plurality of media content.

11. The system of claim 10, wherein the feedback is obtained without the end user proactively identifying the feedback in the data, and wherein the operations further comprise measuring the cues without alerting the end user that the reaction of the end user is being monitored.

12. The system of claim 10, wherein the feedback comprises audible cues of the reaction of the end user to the media content item.

13. The system of claim 10, wherein the feedback comprises audio cues that are sounds without speech.

14. The system of claim 10, wherein the feedback comprises visual cues of the reaction of the end user to the media content item.

15. The system of claim 10, wherein the feedback comprises audio-visual cues of the reaction of the end user to the media content item.

16. The system of claim 15, wherein the feedback includes aurally distinguishable cues, including screams and laughter.

17. The system of claim 10, wherein the cues are based on one of frequency, duration, or frequency and duration of the feedback.

18. The system of claim 10, wherein the feedback is captured during presentation of a media content item at equipment of the end user to provide one of real-time feedback or near-real-time feedback regarding the reaction of the end user to the media content item.

19. A non-transitory, machine-readable storage medium comprising instructions which, responsive to being executed by a processing system including a processor, facilitate performance of operations, comprising:
accessing data comprising cues based on feedback obtained from equipment of an end user regarding captured end user reactions to media content;
processing the cues by measuring cue frequency and duration based on a frequency and duration of the feedback, wherein the cue frequency includes a count of the cues;
monitoring the cues according to a plurality of acoustic models;
determining types of the cues based on the monitoring of the cues, wherein the types of the cues include verbal cues and non-verbal cues;
generating a continuous ratings profile of the media content based on the cue type and the cue frequency and duration;
based on the feedback obtained from the equipment, distributing a temporal mapping of the cues against the media content to a virtual audience, advertisers, service providers, or a combination thereof, wherein the service providers include a television network;
providing a plurality of programming recommendations based on the temporal mapping; and
providing producers an indication of a plurality of media content that is most likely to generate revenue based on the temporal mapping, wherein the media content is included in the plurality of media content.

20. The non-transitory, machine-readable storage medium of claim 19, wherein the operations further comprise:
temporally correlating the feedback identified from the processing of the cues with the media content; and
generating, for the media content, the continuous ratings profile based on the temporally correlating of the feedback.

* * * * *